US008981835B2

(12) United States Patent
Pan

(10) Patent No.: US 8,981,835 B2
(45) Date of Patent: Mar. 17, 2015

(54) EFFICIENT VOLTAGE DOUBLER

(71) Applicant: SanDisk Technologies Inc., Plano, TX (US)

(72) Inventor: Feng Pan, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/921,072

(22) Filed: Jun. 18, 2013

(65) Prior Publication Data

US 2014/0368262 A1  Dec. 18, 2014

(51) Int. Cl.
G06F 1/10 (2006.01)
H02M 3/07 (2006.01)

(52) U.S. Cl.
CPC .................................. *H02M 3/07* (2013.01)
USPC .......................................................... 327/536

(58) Field of Classification Search
USPC ......................................... 327/535, 536, 537
See application file for complete search history.

(56) References Cited

U.S. PATENT DOCUMENTS

| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham |
| 4,736,121 A | 4/1988 | Cini et al. |
| 4,888,738 A | 12/1989 | Wong et al. |
| 5,140,182 A | 8/1992 | Ichimura |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |

(Continued)

FOREIGN PATENT DOCUMENTS

| DE | 10 2007 026290 | 7/2008 |
| EP | 0 382 929 A | 8/1990 |

(Continued)

OTHER PUBLICATIONS

Feng Pan et al., "Charge Pump Circuit Design", McGraw-Hill, 2006, 26 pages.

(Continued)

*Primary Examiner* — Jeffrey Zweizig
(74) *Attorney, Agent, or Firm* — Davis Wright Tremaine LLP

(57) ABSTRACT

A charge pump circuit using a voltage doubler-type of circuitry for generating an output voltage is described. An output generating stage uses a voltage double structure, except that the transistors in each leg are not cross-coupled to the other leg, but instead are controlled by an auxiliary section. The auxiliary section has a voltage doubler structure, but is not used to drive the load, but instead provides the gate voltage for the precharge section using the same levels as used for the corresponding transistors in the auxiliary section. This arrangement can be particularly advantageous for applications using low supply voltages to address self-loading effect due to loading. As the auxiliary section does not drive the load, its elements can be sized smaller. Additional improvement can be obtained by using separate clock drivers for the auxiliary section to address secondary self-loading effect due to loading.

7 Claims, 11 Drawing Sheets

(56) References Cited

U.S. PATENT DOCUMENTS

| | | | |
|---|---|---|---|
| 5,539,351 A | 7/1996 | Gilsdorf et al. |
| 5,563,779 A | 10/1996 | Cave et al. |
| 5,563,825 A | 10/1996 | Cernea et al. |
| 5,568,424 A | 10/1996 | Cernea et al. |
| 5,570,315 A | 10/1996 | Tanaka et al. |
| 5,592,420 A | 1/1997 | Cernea et al. |
| 5,596,532 A | 1/1997 | Cernea et al. |
| 5,602,794 A | 2/1997 | Javanifard et al. |
| 5,621,685 A | 4/1997 | Cernea et al. |
| 5,625,544 A | 4/1997 | Kowshik et al. |
| 5,693,570 A | 12/1997 | Cernea et al. |
| 5,732,039 A | 3/1998 | Javanifard et al. |
| 5,734,286 A | 3/1998 | Takeyama et al. |
| 5,767,735 A | 6/1998 | Javanifard et al. |
| 5,781,473 A | 7/1998 | Javanifard et al. |
| 5,801,987 A | 9/1998 | Dinh |
| 5,818,766 A | 10/1998 | Song |
| 5,828,596 A | 10/1998 | Takata et al. |
| 5,903,495 A | 5/1999 | Takeuchi et al. |
| 5,943,226 A | 8/1999 | Kim |
| 5,945,870 A | 8/1999 | Chu et al. |
| 5,969,565 A | 10/1999 | Naganawa |
| 5,969,988 A | 10/1999 | Tanzawa et al. |
| 5,973,546 A | 10/1999 | Le et al. |
| 5,982,222 A | 11/1999 | Kyung |
| 6,008,690 A | 12/1999 | Takeshima et al. |
| 6,016,073 A | 1/2000 | Ghilardelli et al. |
| 6,018,264 A | 1/2000 | Jin |
| 6,023,187 A | 2/2000 | Camacho et al. |
| 6,026,002 A | 2/2000 | Viehmann |
| 6,046,935 A | 4/2000 | Takeuchi et al. |
| 6,104,225 A | 8/2000 | Taguchi et al. |
| 6,107,862 A | 8/2000 | Mukainakano et al. |
| 6,134,145 A | 10/2000 | Wong |
| 6,147,566 A | 11/2000 | Pizzuto et al. |
| 6,151,229 A | 11/2000 | Taub et al. |
| 6,154,088 A | 11/2000 | Chevallier et al. |
| 6,157,242 A | 12/2000 | Fukui |
| 6,188,590 B1 | 2/2001 | Chang et al. |
| 6,198,645 B1 | 3/2001 | Kotowski et al. |
| 6,208,198 B1 | 3/2001 | Lee |
| 6,249,445 B1 | 6/2001 | Sugasawa |
| 6,249,898 B1 | 6/2001 | Koh et al. |
| 6,275,096 B1 | 8/2001 | Hsu et al. |
| 6,278,294 B1 | 8/2001 | Taniguchi |
| 6,285,622 B1 | 9/2001 | Haraguchi et al. |
| 6,297,687 B1 | 10/2001 | Sugimura |
| 6,307,425 B1 | 10/2001 | Chevallier et al. |
| 6,314,025 B1 | 11/2001 | Wong |
| 6,320,428 B1 | 11/2001 | Atsumi et al. |
| 6,320,796 B1 | 11/2001 | Voo et al. |
| 6,329,869 B1 | 12/2001 | Matano |
| 6,344,959 B1 | 2/2002 | Milazzo |
| 6,344,984 B1 | 2/2002 | Miyazaki |
| 6,356,062 B1 | 3/2002 | Elmhurst et al. |
| 6,359,798 B1 | 3/2002 | Han et al. |
| 6,369,642 B1 | 4/2002 | Zeng et al. |
| 6,370,075 B1 | 4/2002 | Haeberli et al. |
| 6,385,107 B1 | 5/2002 | Bedarida et al. |
| 6,400,202 B1 | 6/2002 | Fifield et al. |
| 6,404,274 B1 | 6/2002 | Hosono et al. |
| 6,411,157 B1 | 6/2002 | Hsu et al. |
| 6,424,570 B1 | 7/2002 | Le et al. |
| 6,445,243 B2 | 9/2002 | Myono |
| 6,456,154 B2 | 9/2002 | Sugimura |
| 6,456,170 B1 | 9/2002 | Segawa et al. |
| 6,476,666 B1 | 11/2002 | Palusa et al. |
| 6,486,728 B2 | 11/2002 | Kleveland |
| 6,518,830 B2 | 2/2003 | Gariboldi et al. |
| 6,522,191 B1 | 2/2003 | Cha et al. |
| 6,525,614 B2 | 2/2003 | Tanimoto |
| 6,525,949 B1 | 2/2003 | Johnson et al. |
| 6,531,792 B2 | 3/2003 | Oshio |
| 6,538,930 B2 | 3/2003 | Ishii et al. |
| 6,545,529 B2 | 4/2003 | Kim |
| 6,556,465 B2 | 4/2003 | Wong et al. |
| 6,577,535 B2 | 6/2003 | Pasternak |
| 6,606,267 B2 | 8/2003 | Wong |
| 6,661,682 B2 | 12/2003 | Kim et al. |
| 6,703,891 B2 | 3/2004 | Tanaka |
| 6,724,241 B1 | 4/2004 | Bedarida et al. |
| 6,734,718 B1 | 5/2004 | Pan |
| 6,737,907 B2 | 5/2004 | Hsu et al. |
| 6,760,262 B2 | 7/2004 | Haeberli et al. |
| 6,762,640 B2 | 7/2004 | Katsuhisa |
| 6,781,440 B2 | 8/2004 | Huang |
| 6,798,274 B2 | 9/2004 | Tanimoto |
| 6,819,162 B2 | 11/2004 | Pelliconi |
| 6,834,001 B2 | 12/2004 | Myono |
| 6,859,091 B1 | 2/2005 | Nicholson et al. |
| 6,878,981 B2 | 4/2005 | Eshel |
| 6,891,764 B2 | 5/2005 | Li |
| 6,894,554 B2 | 5/2005 | Ito |
| 6,922,096 B2 * | 7/2005 | Cernea .......... 327/536 |
| 6,927,441 B2 | 8/2005 | Pappalardo et al. |
| 6,933,768 B2 | 8/2005 | Hausmann |
| 6,944,058 B2 | 9/2005 | Wong |
| 6,954,386 B2 | 10/2005 | Narui et al. |
| 6,975,135 B1 | 12/2005 | Bui |
| 6,985,397 B2 | 1/2006 | Tokui et al. |
| 6,990,031 B2 | 1/2006 | Hashimoto et al. |
| 6,995,603 B2 | 2/2006 | Chen et al. |
| 7,002,381 B1 | 2/2006 | Chung |
| 7,023,260 B2 | 4/2006 | Thorp et al. |
| 7,030,683 B2 | 4/2006 | Pan et al. |
| 7,092,263 B2 | 8/2006 | Chang |
| 7,113,023 B2 | 9/2006 | Cernea |
| 7,116,154 B2 | 10/2006 | Guo |
| 7,116,155 B2 | 10/2006 | Pan |
| 7,120,051 B2 | 10/2006 | Gorobets et al. |
| 7,123,078 B2 | 10/2006 | Seo |
| 7,129,538 B2 | 10/2006 | Lee et al. |
| 7,129,759 B2 | 10/2006 | Fukami |
| 7,135,910 B2 | 11/2006 | Cernea |
| 7,135,911 B2 | 11/2006 | Imamiya |
| 7,205,682 B2 | 4/2007 | Kuramori |
| 7,208,996 B2 | 4/2007 | Suzuki et al. |
| 7,215,179 B2 | 5/2007 | Yamazoe et al. |
| 7,224,591 B2 | 5/2007 | Kaishita et al. |
| 7,227,780 B2 | 6/2007 | Komori et al. |
| 7,239,192 B2 | 7/2007 | Tailliet |
| 7,253,675 B2 * | 8/2007 | Aksin et al. .......... 327/390 |
| 7,253,676 B2 | 8/2007 | Fukuda et al. |
| 7,259,612 B2 | 8/2007 | Saether |
| 7,276,960 B2 | 10/2007 | Peschke |
| 7,279,957 B2 | 10/2007 | Yen |
| 7,345,928 B2 | 3/2008 | Li |
| 7,348,829 B2 | 3/2008 | Choy et al. |
| 7,368,979 B2 | 5/2008 | Govindu et al. |
| 7,397,677 B1 | 7/2008 | Collins et al. |
| 7,468,628 B2 | 12/2008 | Im et al. |
| 7,495,500 B2 | 2/2009 | Al-Shamma et al. |
| 7,521,978 B2 | 4/2009 | Kim et al. |
| 7,554,311 B2 | 6/2009 | Pan |
| 7,579,902 B2 | 8/2009 | Frulio et al. |
| 7,579,903 B2 | 8/2009 | Oku |
| 7,602,233 B2 * | 10/2009 | Pietri et al. .......... 327/536 |
| 7,667,529 B2 | 2/2010 | Consuelo et al. |
| 7,671,572 B2 | 3/2010 | Chung |
| 7,696,812 B2 | 4/2010 | Al-Shamma et al. |
| 7,772,914 B2 | 8/2010 | Jung |
| 7,795,952 B2 | 9/2010 | Lui et al. |
| 7,830,203 B2 | 11/2010 | Chang et al. |
| 7,928,796 B2 | 4/2011 | Namekawa |
| 7,944,277 B1 | 5/2011 | Sinitsky et al. |
| 7,956,675 B2 | 6/2011 | Saitoh et al. |
| 7,969,235 B2 * | 6/2011 | Pan .......... 327/537 |
| 8,040,174 B2 | 10/2011 | Likhterov |
| 8,093,953 B2 | 1/2012 | Pierdomineco et al. |
| 8,159,091 B2 | 4/2012 | Yeates |
| 8,193,853 B2 | 6/2012 | Hsieh et al. |
| 8,242,834 B2 | 8/2012 | Chuang et al. |
| 8,339,183 B2 | 12/2012 | Htoo et al. |
| 8,395,440 B2 | 3/2013 | Shandhu et al. |

(56) References Cited

U.S. PATENT DOCUMENTS

| | | | |
|---|---|---|---|
| 8,604,868 B2 * | 12/2013 | Ucciardello et al. | 327/536 |
| 8,643,358 B2 | 2/2014 | Yoon | |
| 2002/0008566 A1 | 1/2002 | Taito et al. | |
| 2002/0014908 A1 | 2/2002 | Lauterbach | |
| 2002/0075063 A1 | 6/2002 | Hwang | |
| 2002/0075706 A1 | 6/2002 | Foss et al. | |
| 2002/0130701 A1 | 9/2002 | Kleveland | |
| 2002/0130704 A1 | 9/2002 | Myono et al. | |
| 2002/0140463 A1 | 10/2002 | Cheung | |
| 2003/0128560 A1 | 7/2003 | Saiki et al. | |
| 2003/0214346 A1 | 11/2003 | Pelliconi | |
| 2004/0046603 A1 | 3/2004 | Bedarida et al. | |
| 2005/0024125 A1 * | 2/2005 | McNitt et al. | 327/536 |
| 2005/0030088 A1 | 2/2005 | Cernea | |
| 2005/0093614 A1 | 5/2005 | Lee | |
| 2005/0195017 A1 | 9/2005 | Chen et al. | |
| 2005/0237103 A1 | 10/2005 | Cernea | |
| 2005/0248386 A1 | 11/2005 | Pan et al. | |
| 2006/0114053 A1 | 6/2006 | Sohara et al. | |
| 2006/0119393 A1 | 6/2006 | Hua et al. | |
| 2006/0244518 A1 | 11/2006 | Byeon et al. | |
| 2006/0250177 A1 | 11/2006 | Thorp et al. | |
| 2007/0001745 A1 | 1/2007 | Yen | |
| 2007/0053216 A1 | 3/2007 | Alenin | |
| 2007/0069805 A1 | 3/2007 | Choi et al. | |
| 2007/0126494 A1 | 6/2007 | Pan | |
| 2007/0139099 A1 | 6/2007 | Pan | |
| 2007/0139100 A1 | 6/2007 | Pan | |
| 2007/0210853 A1 | 9/2007 | Maejima | |
| 2007/0211502 A1 | 9/2007 | Komiya | |
| 2007/0222498 A1 | 9/2007 | Choy et al. | |
| 2007/0229149 A1 | 10/2007 | Pan et al. | |
| 2008/0024096 A1 | 1/2008 | Pan | |
| 2008/0024198 A1 | 1/2008 | Bitonti et al. | |
| 2008/0042731 A1 | 2/2008 | Daga et al. | |
| 2008/0111604 A1 | 5/2008 | Boerstler et al. | |
| 2008/0116963 A1 | 5/2008 | Jung | |
| 2008/0136500 A1 | 6/2008 | Frulio et al. | |
| 2008/0157852 A1 | 7/2008 | Pan | |
| 2008/0157859 A1 | 7/2008 | Pan | |
| 2008/0218134 A1 | 9/2008 | Kawakami | |
| 2008/0239802 A1 | 10/2008 | Thorpe | |
| 2008/0239856 A1 | 10/2008 | Thorpe | |
| 2008/0278222 A1 | 11/2008 | Conti et al. | |
| 2008/0307342 A1 | 12/2008 | Furches et al. | |
| 2009/0033306 A1 | 2/2009 | Tanzawa | |
| 2009/0051413 A1 | 2/2009 | Chu et al. | |
| 2009/0058506 A1 | 3/2009 | Nandi et al. | |
| 2009/0058507 A1 | 3/2009 | Nandi et al. | |
| 2009/0091366 A1 | 4/2009 | Baek et al. | |
| 2009/0121780 A1 | 5/2009 | Chen et al. | |
| 2009/0153230 A1 | 6/2009 | Pan et al. | |
| 2009/0153231 A1 | 6/2009 | Pan et al. | |
| 2009/0153232 A1 | 6/2009 | Fort et al. | |
| 2009/0167418 A1 | 7/2009 | Ragavan | |
| 2009/0174441 A1 | 7/2009 | Gebara et al. | |
| 2009/0184697 A1 | 7/2009 | Park | |
| 2009/0219077 A1 | 9/2009 | Pietri et al. | |
| 2009/0315598 A1 | 12/2009 | Namekawa | |
| 2009/0315616 A1 | 12/2009 | Nguyen et al. | |
| 2009/0322413 A1 | 12/2009 | Huynh et al. | |
| 2010/0019832 A1 | 1/2010 | Pan | |
| 2010/0033232 A1 | 2/2010 | Pan | |
| 2010/0074034 A1 | 3/2010 | Cazzaniga | |
| 2010/0085794 A1 | 4/2010 | Chen et al. | |
| 2010/0118625 A1 | 5/2010 | Matano | |
| 2010/0127761 A1 | 5/2010 | Matano | |
| 2010/0244935 A1 | 9/2010 | Kim et al. | |
| 2010/0302877 A1 | 12/2010 | Bang | |
| 2011/0026329 A1 | 2/2011 | Wada | |
| 2011/0133821 A1 | 6/2011 | Honda | |
| 2011/0156803 A1 | 6/2011 | Yap et al. | |
| 2011/0176370 A1 | 7/2011 | Izumi et al. | |
| 2011/0254615 A1 | 10/2011 | Raghunathan et al. | |
| 2012/0230071 A1 | 9/2012 | Kaneda | |
| 2013/0162229 A1 | 6/2013 | Chan | |

FOREIGN PATENT DOCUMENTS

| | | |
|---|---|---|
| EP | 0 780 515 A | 6/1997 |
| JP | 2007-020268 | 1/2007 |
| WO | 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages. No Date.

Ang et al., "An On-Chip Voltage Regulator Using Switched Decoupling Capacitors," 2000 IEEE International Solid-State Circuits Conference, 2 pages.

U.S. Appl. No. 12/506,998 entitled "Charge Pump with Current Based Regulation", filed Jul. 21, 2009, 21 pages.

U.S. Appl. No. 12/634,385 entitled "Multi-Stage Charge Pump with Variable Number of Boosting Stages", filed Dec. 9, 2009, 33 pages.

* cited by examiner

Non Overlapping Clocks

Non Overlapping Clocks

Non Overlapping Clocks

__

EFFICIENT VOLTAGE DOUBLER

FIELD OF THE INVENTION

This invention pertains generally to the field of charge pumps and more particularly to improving efficiency for pumps using a voltage doubler arrangement.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1 b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the efficiency of pumps.

SUMMARY OF THE INVENTION

In a first general set of aspects, a charge pump circuit generates an output voltage provided at an output node. The charge pump has an output generation stage, an auxiliary section stage, and first and second output gates. The output generation stage includes: a first branch, including a first transistor connected between a stage input voltage and, through a first node, a first plate of a first capacitor, and a second branch, including a second transistor connected between the stage input voltage and, through a second node, a first plate of a second capacitor, wherein a second plate of the first capacitor and a second plate of the second capacitor respectively receive first and second non-overlapping clock signals. The first and second output gates are respectively connected between the first and second nodes and the output node. The auxiliary section stage includes: a first branch, including a third transistor connected between the stage input voltage and, through a third node, a first plate of a third capacitor, and a second branch, including a fourth transistor connected between the stage input voltage and, through a fourth node, a first plate of a fourth capacitor, wherein a second plate of the third capacitor and a second plate of the fourth capacitor respectively receive the first and second non-overlapping clock signals. The gate of the third transistor is connected to the fourth node and the gate of the forth transistor is connected to the third node. The gate of the first transistor is connected to the fourth node and the gate of the second transistor is connected to the third node.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

The techniques presented here are widely applicable to various charge pump designs for the use of cancelling the threshold voltages of the switches (typically implemented as diodes in the prior art) used to prevent the backflow of charge after pump stages. In the following, the description will primarily be based on an exemplary embodiment using a voltage doubler-type of circuit, but the concepts can also be applied to other pump designs.

More information on prior art charge pumps, such as Dickson type pumps, and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096;

7,030,683; 7,554,311; 7,368,979; 7,795,952; 7,135,910; 7,973,592; and 7,969,235; US Patent Publication numbers 2009-0153230-A1; 2009-0153232-A1; 2009-0315616-A1; 2009-0322413-A1; 2009-0058506-A1; US-2011-0148509-A1; 2007-0126494-A1; 2007-0139099-A1; 2008-0307342 A1; 2009-0058507 A1; 2012-0154023; 2012-0154022; and 2013-0063118; and U.S. patent application Ser. Nos. 13/618,482; 13/628,465; and Ser. No. 13/886,066.

Figure 2:
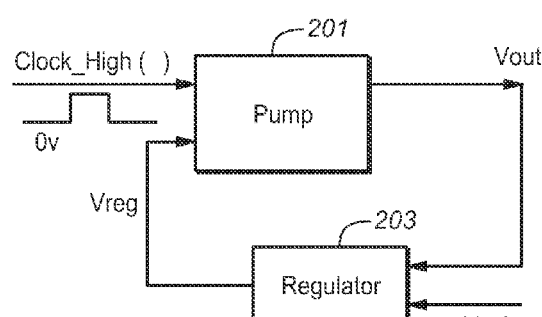
FIG. 2 is a top-level block diagram for a regulated charge pump.

FIG. 2 is a top-level block diagram of a typical charge pump arrangement. The designs described here differ from the prior art in details of how the pump section 201. As shown in FIG. 2, the pump 201 has as inputs a clock signal and a voltage Vreg and provides an output Vout. The high (Vdd) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although in some usages "charge pump" refers to just the pump section 201.)

Figure 3A:
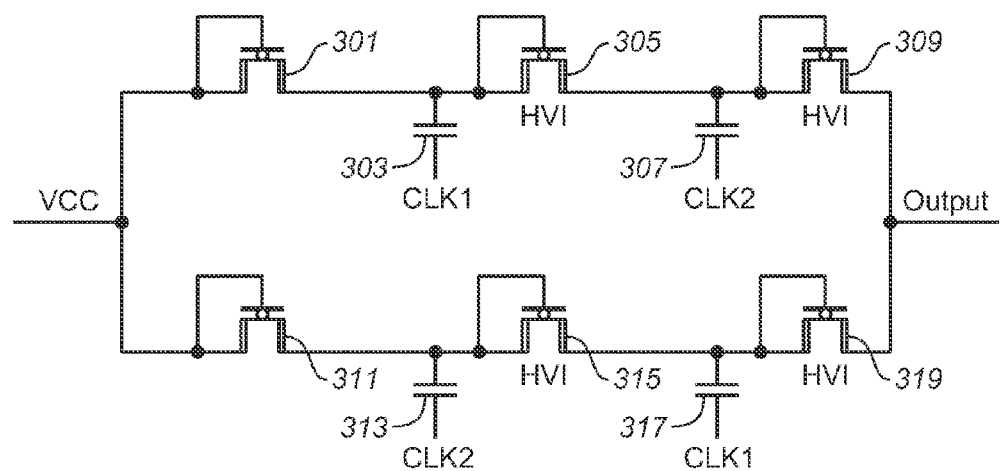
FIGS. 3A and 3B show a 2 stage, 2 branch version of a conventional Dickson type charge pump and corresponding clock signals.
Figure 3B:
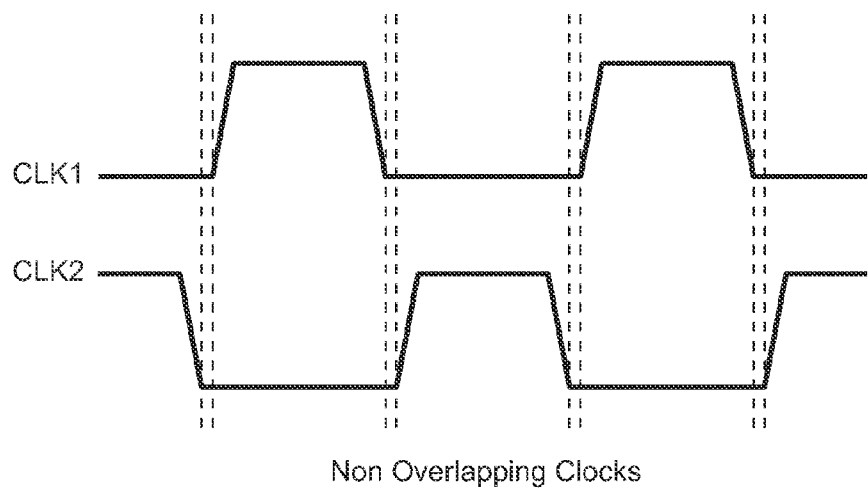

FIG. 3A shows a 2 stage, 2 branch version of a conventional Dickson type charge pump that receives Vcc as its input voltage on the left and generates from it an output voltage on the right. The top branch has a pair of capacitors 303 and 307 with top plates connected along the branch and bottom plates respectively connected to the non-overlapping clock signals CLK1 and CLK2, such as those shown in FIG. 3B. The capacitors 303 and 307 are connected between the series of transistors 301, 305, and 309, which are all diode connected to keep the charge from flowing back to the left. The bottom branch is constructed of transistors 311, 315, and 319 and capacitors 313 and 317 arranged in the same manner as the top branch, but with the clocks reversed so the tow branches will alternately drive the output.

Figure 1A:
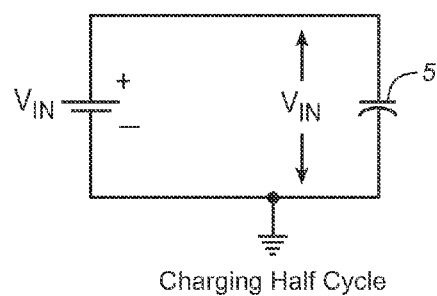
FIG. 1a is a simplified circuit diagram of the charging half cycle in a generic charge pump.
Figure 1B:
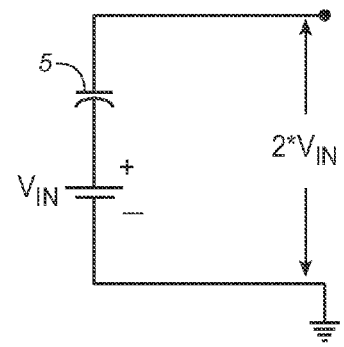
FIG. 1b is a simplified circuit diagram of the transfer half cycle in a generic charge pump.

Although the transistors in FIG. 3A are connected to function as diodes, they are not ideal diodes, in the sense that there will be a voltage drop across each of transistors. Between the drain and source of each of these transistors will be a voltage drop. This voltage drop will be the threshold voltage, Vt, of the transistor when there is no current flowing and Vt+ΔVds when there is current, where extra drain-source voltage drop can become proportionately quite large as current increases. Consequently, these voltage drops will reduce the output voltage of a real charge pump below that of the idealized charge pump like that discussed above in the Background with respect to FIG. 1.

Various methods are known to overcome this voltage drops. For example, the number of stages in each branch can be increased to just pump the voltage up higher and the later stages can be used to cancel the threshold voltages. Another example could be a four phase Vt cancellation scheme. However, these prior cancellation techniques have limitations of one sort or another. For example, increases in the number of stages results in increases for both the required layout area and power consumption. Further, as each subsequent transistor in the series is subjected to higher voltages, their respective voltage drops become higher and the incremental gain in each stage correspondingly diminishes. In a four phase Vt cancellation scheme, the clock skews used can be difficult to control due to mismatch and routings.

Instead, the techniques presented here cancel the threshold voltage by introducing a threshold voltage cancellation section that has the same structure as the main section of the charge pump that supplies the output. In the main section, rather than use the transistors connected as diodes, the threshold voltage cancellation stage uses the outputs from the section of the main section that it is mirroring to control the transistors. This will be illustrated using an exemplary embodiment based on a voltage doubler type of charge pump, which has been found to particular for use as an efficient low voltage output charge pump, where, in this example, the goal is to generate a target output of 4 volts from an input voltage of 2.5 volts.

More specifically, with an input voltage of Vcc=2.5 volts, to generate a 4 volt output supply able to deliver 2 mA output current, with minimum input current Icc and area requirements and good power efficiency is challenging. Normally, the sort of Dickson pump of FIG. 3 is the basic architecture for a charge pump; however, for these sorts of values, Dickson pumps have relatively large die size, higher Icc consumption and less efficiency. Normal Vt cancellation schemes are difficult to apply to such architectures. As noted above, these are normally implemented with Dickson pump by pumping to higher than 4 volts in order to meet the design requirement and overcome the higher internal impedance.

Figure 4A:
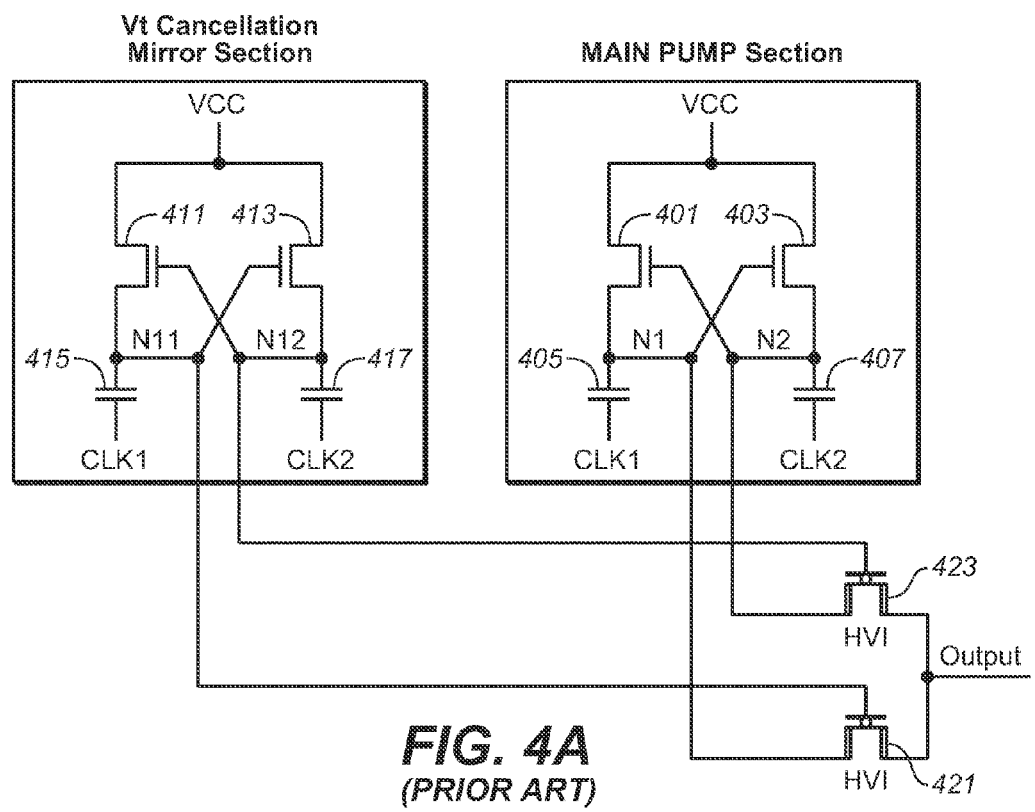
FIGS. 4A and 4B show an exemplary embodiment based on a voltage doubler-type of charge pump.
Figure 4B:
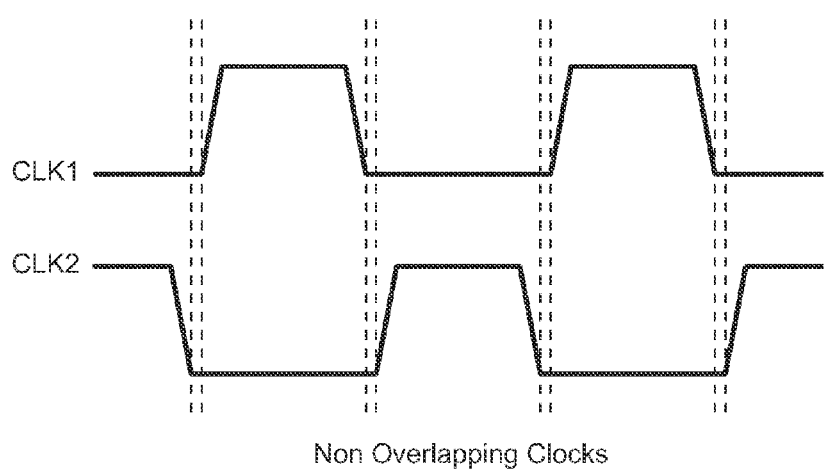

FIG. 4A shows the exemplary embodiment. The main, or output, pump section provides the output to drive the load and has the structure of a voltage doubler. the input voltage Vcc is provided to both branches and through transistor 401 to node N1 in the first branch and through transistor 403 to node N2 in the second branch. The control gates of each of these transistors is then attached to receive the voltage on the other branch, with the gate of 403 to node N1 and the gate of 401 to N2. Each of the nodes is also coupled to a capacitor, respectively capacitor 405 driven by the clock signal CLK1 and capacitor 407 driven by the clock signal CLK2. The clock signals are again non-overlapping clock's such as shown in FIG. 4B. The clock signals can be generated in any of the known manners. As the clocks alternate, the output of each branch will alternately (ideally) provide a doubled output voltage from the nodes N1 and N2, which are then combined to form the pump output.

To prevent the charge from flowing back from the output into the pump, the nodes N1 and N2 are respectively connected to the output through transistors 421 and 423. In a typical prior art arrangement, these two transistors would be connected as diodes, having their control gates connected to also receive the voltages on N1 and N2, respectively. However, this would result in the sort of voltage drops described above. Instead, a threshold voltage cancellation section, as shown on the left side of FIG. 4A is introduced to supply the control gate voltages for these output transistors 421 and 423.

The Vt cancellation section has the same structure and the output section and mirrors its function. A first branch includes transistor 411 and capacitor 415 and a second branch includes transistor 413 and capacitor 417, with the control gates of the transistor in each branch cross-coupled to the output node of the other branch. The output of each branch of the threshold cancellation stage is used to drive the output transistor of the corresponding branch in the output section: the node N11 of the cancellation section is used for the control gate voltage of transistor 421 and the node N22 of the cancellation section is used for the control gate voltage of transistor 423. Since the capacitors in the cancellation section are clocked the same as the same element that they mirror in the output section, when the node N1 of the output section is high, the node N11 in the cancellation section will also be high, so that transistor 421 is on and the output voltage passed; N1 and N11 will similarly be low at the same time, so that 421 is turned off to prevent the back flow of charge. The nodes N2, N22 and transistor 423 function similarly.

Although described here for a pump design based on a voltage doubler, this sort of arrangement for the cancellation of threshold can be used charge pump types. More generally, when used with other designs, in addition to the output section, which will be formed with the same architecture as usual, there will also be a voltage threshold cancellation section formed with the same structure. In the main output section, the transistors typically connected as diodes to charge from back flowing will now have their control gates connected to be set to a voltage from the mirrored node in the voltage cancellation section. For example, going back to FIG. 3A, taking the shown Dickson pump as the output section, a voltage cancellation stage of the same structure (less transistors 309 and 319, which take the role of 421 and 423 in FIG. 4A) would also be included. The level on the equivalent of the top plate of 307 on the cancellation stage would control the gate of 309, the level on the equivalent of the top plate of 303 would control the gate of 305, and so on for the other branch.

It should be noted that although the output section and the cancellation section have the same structure, the various mirrored elements of the circuits need not have the same size since the elements of the output stage need to drive the load of the charge pump, whereas those of the cancellation are only driving some control gates. Returning to the exemplary embodiment, the transistors 401 and 403 and capacitors 405 and 407 need provide sufficient output for the application (e.g., 4 volts and 2 mA). In contrast, the transistors 411 and 413 and capacitors 415 and 417 need only provide sufficient output for the control gate voltage of transistors 421 and 423. For example, if the transistors in the cancellation stages need only be sized a tenth or twentieth that of the elements they mirror in the output stage.

Compared with a typical prior art design based upon a Dickson pump, the exemplary embodiment of FIG. 4A has been found to be of higher efficiency for the target values (output of 2 mA at 4V with an input voltage of 2.5V). More specifically, using a voltage doubler for both the main and the Vt cancellation stage yields about twice the efficiency, with 50% less input current (Icc) consumption. Area efficiency is also improve as the doubler type design can provide these values with less stages, yielding an area efficiency requirement of about 40% that of a conventional Dickson pump.

The scheme presented here also has a number of other advantages. Unlike other Vt cancellation techniques, there is no requirement of the main, output section's stages to cancel the Vts, as the cancellation section handles this. There is also no reliance on complex clock phases or skews since the two pump sections operate in phase with each other. Additionally, the use of identical structures for the two sections results in a better and easier layout matching and clock skew matching of the pump clocks. In particular, the simple design and simple layout requirements are a distinct practical advantage.

Figure 5:
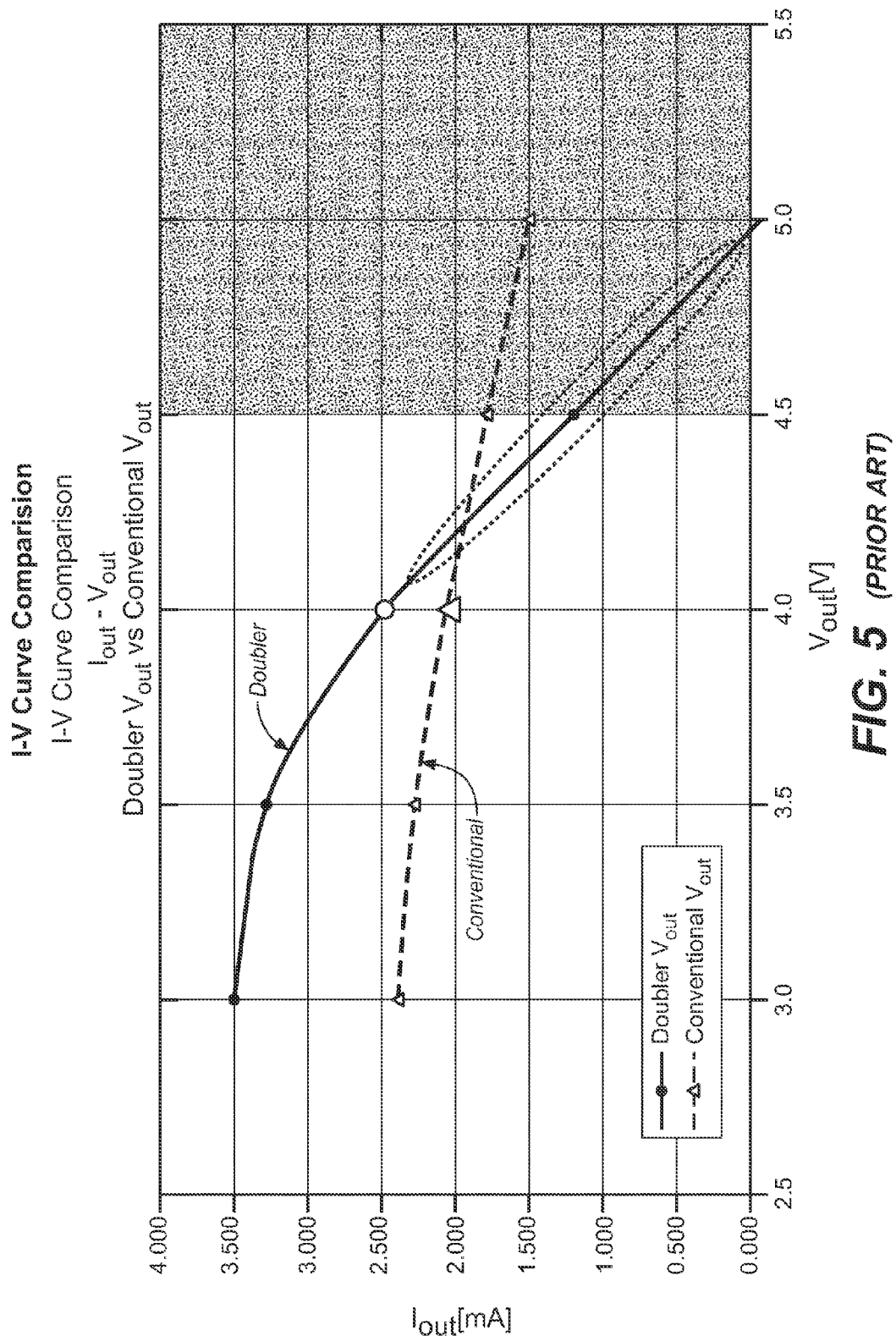
FIG. 5 shows a comparison of the output I-V curve for the exemplary embodiment versus a conventional pump design.
Figure 6:
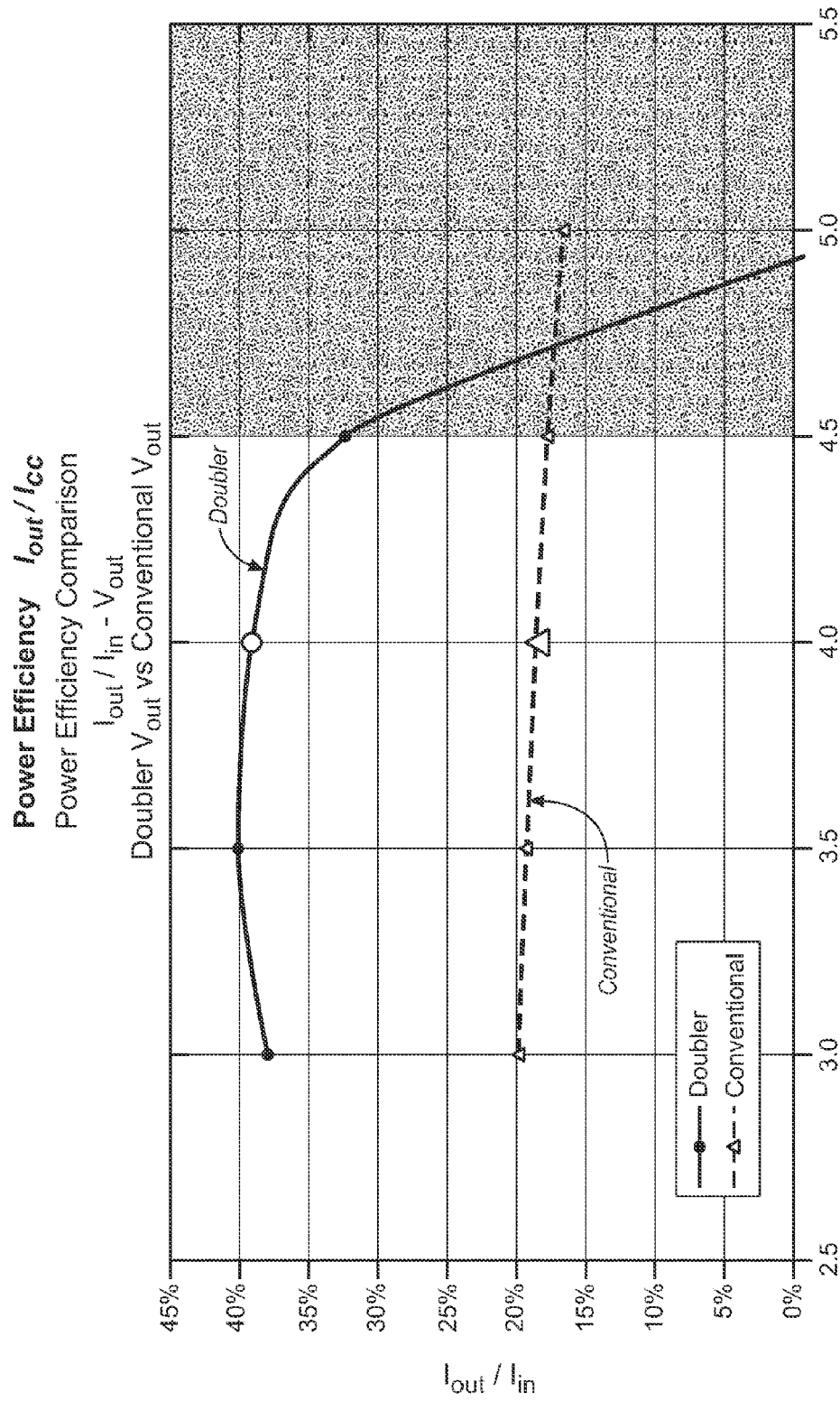
FIG. 6 shows a comparison of the output (Iout/Iin) versus Vout curve for the exemplary embodiment versus a conventional pump design.
Figure 7:
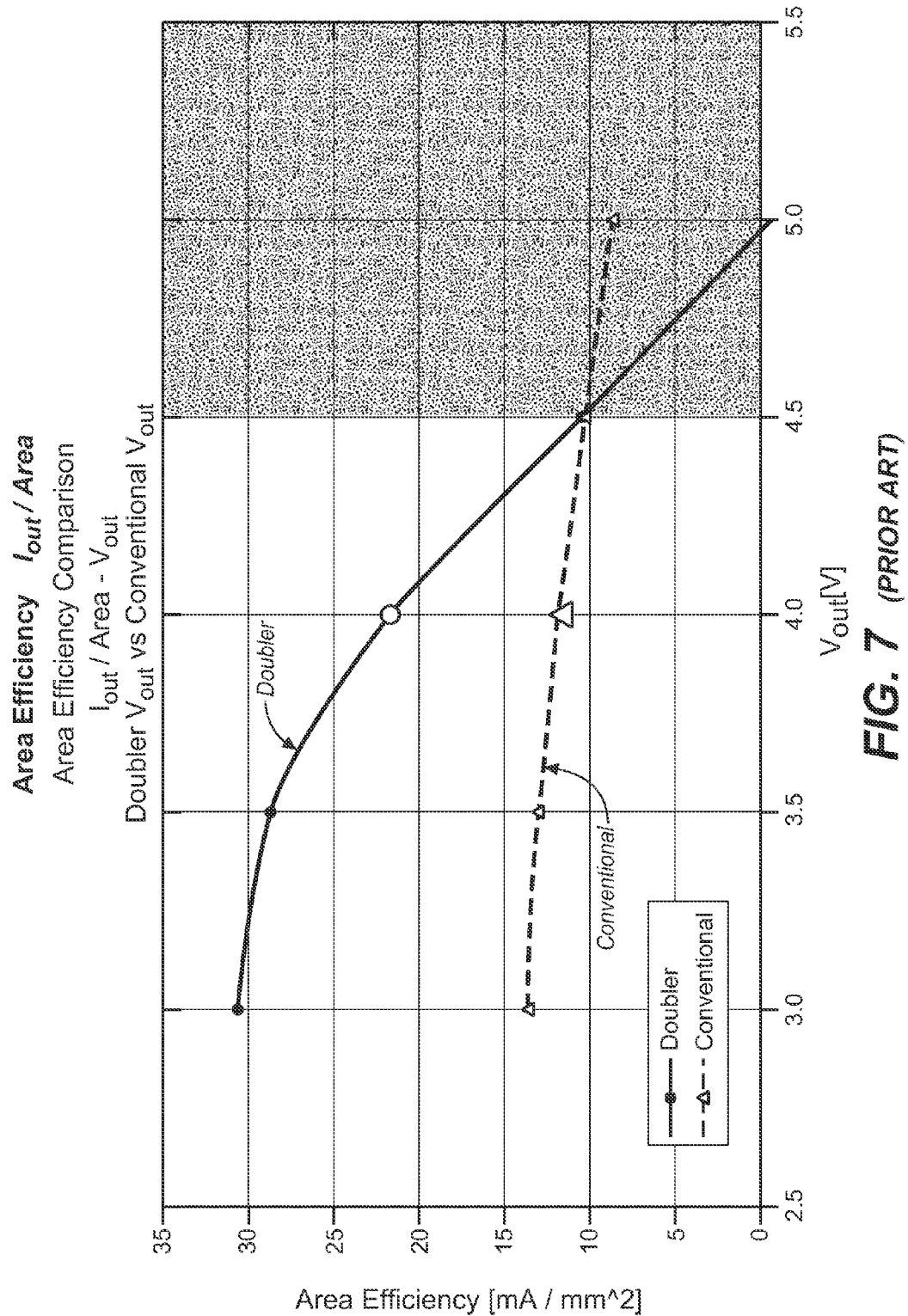
FIG. 7 shows a comparison of the output (Iout/area) versus Vout curve for the exemplary embodiment versus a conventional pump design.

FIGS. 5-7 can help illustrate the efficient of the exemplary embodiment as a low output voltage pump. FIG. 5 shows a comparison of the output I-V curve for the exemplary embodiment versus a conventional pump design. As shown, the doubler can theoretically double the input voltage, here Vcc=2.5, to 5V maximum. The operation region will typically be for voltages of 4.5V or less, as the design is particularly effective between 3V and 4V. For higher outputs from the same input, the design of FIG. 4A can have its number of stages expanded.

FIG. 6 shows a comparison of the output (Iout/Iin) versus Vout curve for the exemplary embodiment versus a conventional pump design. The power efficiency of the exemplary embodiment is over twice that of a conventional pump at Vout=4V.

FIG. 7 shows a comparison of the output (Tout/area) versus Vout curve for the exemplary embodiment versus a conventional pump design. The area efficiency of the doubler is about twice that of a conventional pump at Vout=4V, with even better values at lower voltages.

Self-Adaptive Multi-Stage Implementation

As noted above, for higher outputs the charge pump can have multiple stages. Multi-stage charge pumps and, in the exemplary embodiment, a multi-stage implementation of the sort of design described above with respect to FIGS. 4A and 4B are considered.

Figure 8A:
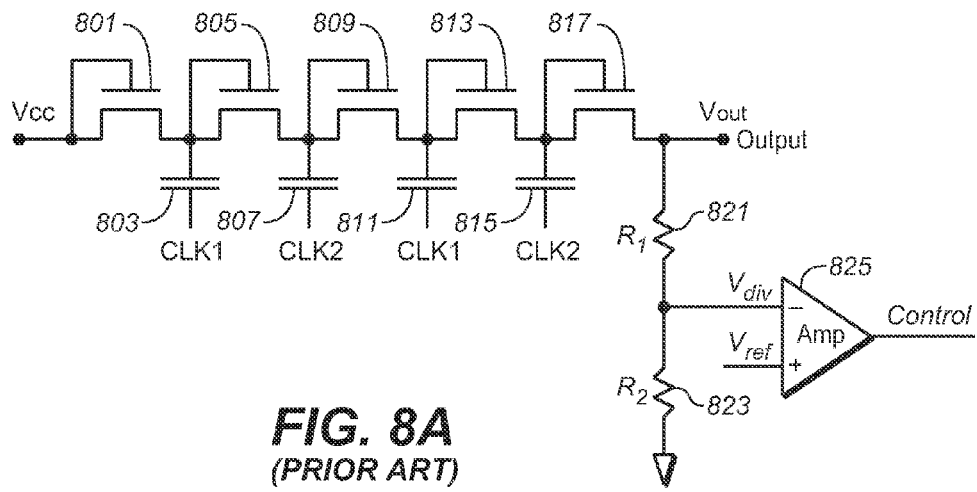
FIGS. 8A-8C illustrates some aspects of a branch of a 4-stage Dickson-type pump and its regulation.
Figure 8B:
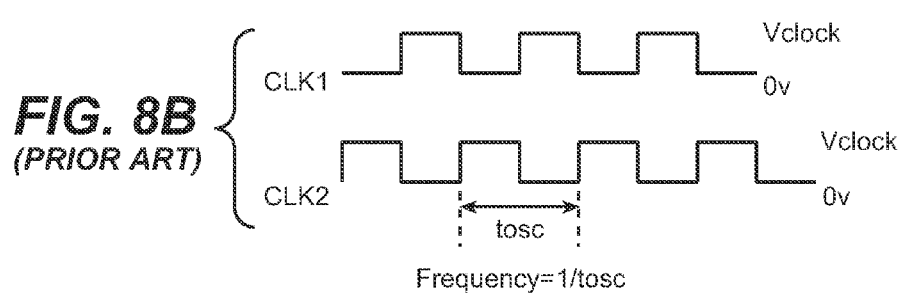

First, the a multi-stage version of the sort of Dickson-type charge discussed above with respect to FIG. 3A is looked at some more to provide some context. FIG. 8A shows a branch of a four stage Dickson-type charge pump and some of the regulation circuitry. A series of diodes 801, 805, 809, 813 and 817, here implemented as diode connected transistors are connected in series with a capacitor (803, 807, 811, 815,) having a top plate connected between each pair of diodes. The bottom plates of the capacitors alternately receive the non-overlapping clock signals CLK1 and CLK2. In this way, the output generates the level Vout from the input VCC. FIG. 8B illustrate the non-overlapping clock signals CLK1 and CLK2 having amplitude Vclock and period tosc. For regulating the charge pump, the output can be fed into a voltage divider, here formed of resistors R1 821 and R2 823, to provide a lower voltage (Vdiv) that can be compared to the reference value Vref by Amp 825 to generate the signal Control for regulating the pump, much as described above with respect to FIGS. 2 and 3.

Charge pump systems are often called upon to generate a large range of output voltages Vpp from the pump output. For example, in an application as a peripheral element on a flash EEPROM memory, Vout may need to range from 4 volts up to 28 volts for erasing or programming in operation. In order to cover this range, the number of stages used for the pump is based upon the highest voltage, in this example 28 volts. The regulation circuitry then varies the operation of the pump to provide the desired output level, as illustrated schematically in FIG. 8C.

Figure 8C:
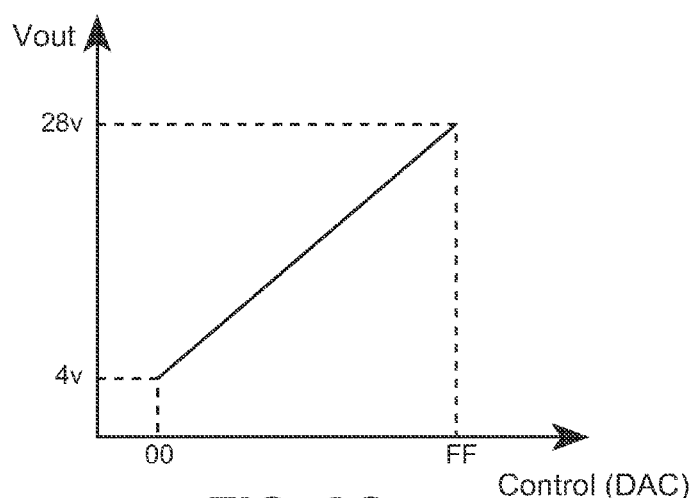

In FIG. 8C the desired output Vout over the exemplary 4 volt to 28 volt range is plotted against the corresponding Control signal, here converted to a digital value ranging from 00 to FF in this example. The regulation can then be implemented by any of the standard, such as varying the clock frequency (1/tosc), clock amplitude (Vclock), pump input (VCC), etc.

While the pump may need to supply a few pulses near 28 volts, the majority of the Vout pulses are typically at a much lower voltage. Pump output impedance is a function of the number of stages. As output impedance increases, the pump is less efficient. For example, Vout operates at 4 volts with 10 stages is much less efficient than if operated at 4 volts with only 2 stages. Also, having more stages than needed for the lower voltage outputs results in a large amount of noise and higher power usage when operating at the lower voltage levels. Consequently, although a traditional charge pump needs to have enough stages to be able to provide the highest needed output value, when operating at lower values it will not as efficient as, and noisier than, a pump specific to the lower output.

To overcome these shortcoming, a charge pump system is described where the number of stages active in boosting the output voltage is automatically self-adaptive based on the desired output. The exemplary embodiment is based on a multi-stage implementation of the design of FIG. 4B. The number of stage is chosen is still based on the maximum output wanted from the design, but when regulated to provide lower output levels, the later stages progressively drop out, so that although the stages are still there, they no longer perform a pumping function and instead act as filtering stages to further reduce noise.

Figure 9:
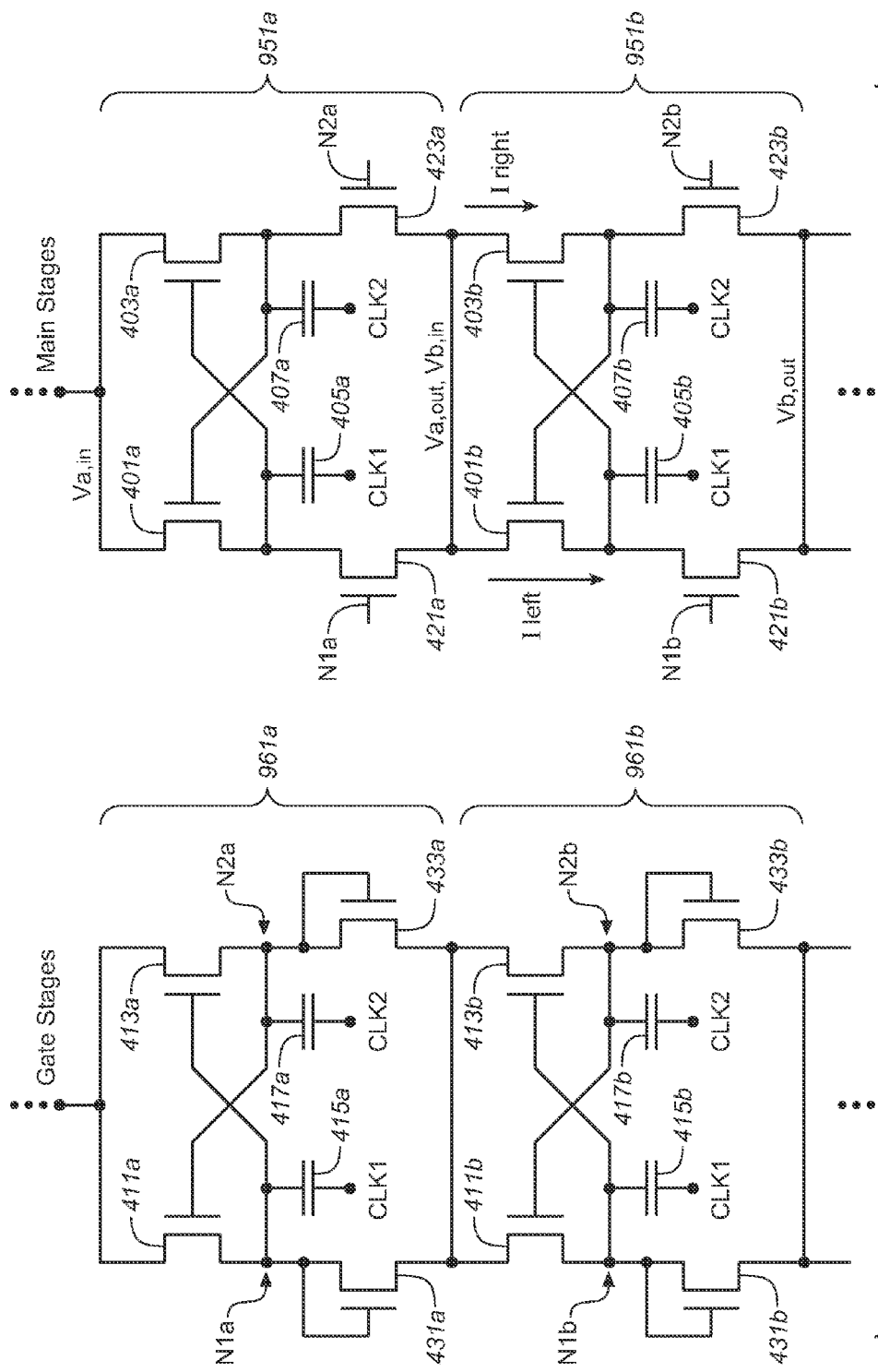
FIG. 9 is an exemplary embodiment of a self-adaptive charge pump.

FIG. 9 illustrates an exemplary embodiment. As shown on the right side, a multiple number of main, or output, pump stages are connected in series, with the output of one stage in the series connected as input the next state. Only two of the stages, 951a and 951b, are explicitly shown to keep the figure manageable and each of the stages has the same structure as on the right hand side of FIG. 4A, but rearranged slight for convenience. (Basically, the placement of the capacitors and output nodes have been swapped between the representations.) For the first stage in the series will be the input voltage, such a Vcc, and the output of the last main stage in the series will be the output for the pump. As before, the legs of each main stage are connected to supply the stages output though a corresponding pair of switches controlled by a corresponding gate stage. Again, only two of the two or more gate stages are shown, with 961a and 961b corresponding to 951a and 951b. These gate stages are (again after some rearrangement) the same as shown on the left of FIG. 4A. For these gate stages, the output of one stage is supplied from the each of legs through a corresponding diode to provide the input of the next gate stage and the level on each leg (prior to the diode) controls the corresponding switch on the main, output stage side (the explicit connection is not shown to keep the e diagram manageable).

In more detail, looking the first stage 951a on the output side of FIG. 9, this shows a voltage double-type structure having a cross-coupled left and right legs that receive the input Va,in, that is either the input level of the pump (for the first stage) or the output of the previous stage (for all stages after the first). The left and right legs respectively have transistors 401a, 403a whose control gates are connected to other leg below these transistors. The gates of 401a, 403a are also respected connected to the top plates of the capacitors 405a, 407a, which in turn have there respective bottom plates driven by the non-overlapping clock signals CLK1, CLK2. The output of the two legs are then combined through the transistors 421a, 423a that are respectively controlled by the levels on the nodes N1a, N2a of the corresponding gate stage 961a to provide the output Va,out for stage 951a, which then acts as the input Vb,in for the next stage. In this way, the threshold voltage on the pass gates 421a, 423b is cancelled, as described above with respect FIGS. 4A and 4B and the subsequent discussion. The last stage in the series will then provide the output for the pump.

For the gate stages, each of these again has a cross-coupled structure similar to that of the corresponding main output stage, as is also discussed in more detail above. The gates stages are connected in series, with each stage's output supplying the next stage's input, except for first, which receives an initial input, and the last, which is only connected to control the pass gates of the last stage (much as shown on the left side of FIG. 4A). The legs of the gate stages in the series (excepting the last) are connected through a pass gate to provide the input to the next stage. In FIG. 9, the pass gates are implemented as the diode connected transistors 431a, 433a and 431b, 433b, although other implementations could use an additional Vt cancellation arrangement for some or all of these pass gates as well. It should be noted that for the gate stages the load is fixed, and that there is no DC current load, only a capacitive load from the pass gates (421, 423) on the main, output stage side.

In this way, higher output voltages can be generated in delivering power to the output, while still cancelling off the threshold voltages of the pass gates on the output side. An analysis of the arrangement of FIG. 9 also shows that it has another advantage, namely that at each stage the voltage is self-adapted to settle by the final output voltage being regulated into using the appropriate number of stages for the desired of output.

More specifically, if the output regulation is varying from, for example, 4 volts to 28 volts as shown, the number of stages, when all active, is selected to be able to provide the highest value of 28 volts; but, when regulated for lower output, the circuit of FIG. 9 will settle to the optimum number of pump stages, which will lead to the minimum charge pump output impedance. This is achieved in a self-adaptive manner, without the system needing to determine how many stages it wants to be active and generating as set of control signals to achieve this. This is distinct from the sort of prior art variable stage charge pump systems, such as those of U.S. Pat. Nos. 6,370,075 and 6,486,728, where control circuitry must determine the desired number of stages wanted to be active and then asserts a set of corresponding control signals to effect this.

To see how this occurs, consider the case where the circuit of FIG. 9 is being regulated to generate an output voltage less than its maximum. The input voltage will be raised progressively though the main stages until it reaches the desired level for the output, which, if this value is sufficiently below the maximum, will happen before the last stage. Consider the case where the output of stage 951a, Va,out, has reached this desired level. On the gate stage side, the nodes N1a and N2a of the corresponding gate stage 961a still operate to control pass gates 421a, 423a as described previously. However, as the gate stages only have no DC current load, only the capacitive load of the main stage pass gates, the subsequent gate stages (961b and any later gate stages) will continue to boost the levels (e.g., N1b, N2b) used on the pass gates (e.g., 421b, 423b) of the main stages down stream from 951a, such as 951b. This results in the pass gates 421b and 423b, as well as any subsequent ones, being left on. Because of this, main stage 951b and subsequent stages no longer are active to boost the output, but instead now act as filters of this output. When a higher output is again needed, 951b will self-adaptively revert back to a pumping function in the reverse manner.

This sort of transition of a pump stage, from being active as a pumping stage into performing a filtering function and back into pumping stage, described with respect to stage 951b will similarly in a self-adaptive way for the other stages of the pump, starting with the last of the main output stages in the series. As noted before, the number of stages for both the gate stages and main stages are selected to be able provide the highest needed output. To take an example, say the pump needs to provide an output voltage over the 4V-28V range again and that to produce the 28 volt level uses six stages. When 28V are needed, all six stages are active pumping, but if the output drops to below, say, 25V, this can be reached with only five stages and the last will transition as described for stage 951b. Similarly, when the desired output drops 20V or less, the fifth stage would switch from actively pumping and both the last two stages would act as a filter capacitance, and so one until at the lowest output levels, only the first one or two stages are active in boosting, with the rest acting as a filtering capacitance. When the output is regulated back up, the stages will kick back into the pumping mode in this self-adaptive manner.

Consequently, as the output regulation is varied from 4V to 28V (or whatever the range is), the circuit will settle to the optimum number of pump stages, leading to a minimum charge pump output impedance. Under this arrangement, the pump impedance is self-adaptive to the output setting. There will consequently be less output noise due to the bypassed stages which also transition to a filtering capacitance. Such a minimizing of charge output impedance will lead can help to optimize the charge pump's performance. Consequently, in addition to the Vt cancellation for the transfer gates of the high voltage charge pump, this provides a simple scheme that is self adaptive to achieve the minimum output impedance and minimize output ripple, all without the need for some sort of control circuitry to somehow determine the desired number of stages and actively implement this somehow.

Concerning regulation, any of the various regulation schemes, such as those described above or in the various references cited above, can be applied to the design here. For example, the output voltage from the main stage could be sampled and the Control signal can either be a logically value or an analog value. The Control signal can be used to, say, control the input voltage supply level, the clock frequency, clock amplitude and so on to maintain the regulation level. (In this clock cases, the regulation control signal, such as Control in FIG. 8A, would need to be used to alter the generation of the clock signals supplied to the pump, a sort of connection not explicitly represented in FIG. 2.) The regulation of the gate stages can be done similarly to the output stages, or done independently with a separate regulator. It the gate stages are using the same regulation as the main stages, it may be desirable to have its output at the various stage to offset relative to the main stage output, using a diode for example.

The various embodiments discussed above are described further in US patent application number US-2010-0019832-A1.

Improving Efficiency of Voltage Doublers

In a typical voltage doubler arrangement, the circuit realizes its potential doubling through alternating phases of the clock to pre-charge the top plate of capacitor, and using the second phase to do voltage doubling to elevate potential of top plate. Since the voltage doubler is used to supply certain amount of current load, the potential on the top plate in the doubling phase can be degraded due to load current, consequently reducing the efficiency of pre-charging. When the load is large enough, the pre-charging voltage will eventually be so low as to cause the voltage doubler output to collapse under the current load. Using the traditional designs, in order to address the issue, more capacitors, pre-charge transistors size, and increased driver size are needed to meet the load requirements, reducing the power and area effectiveness of the circuit.

Figure 10A:
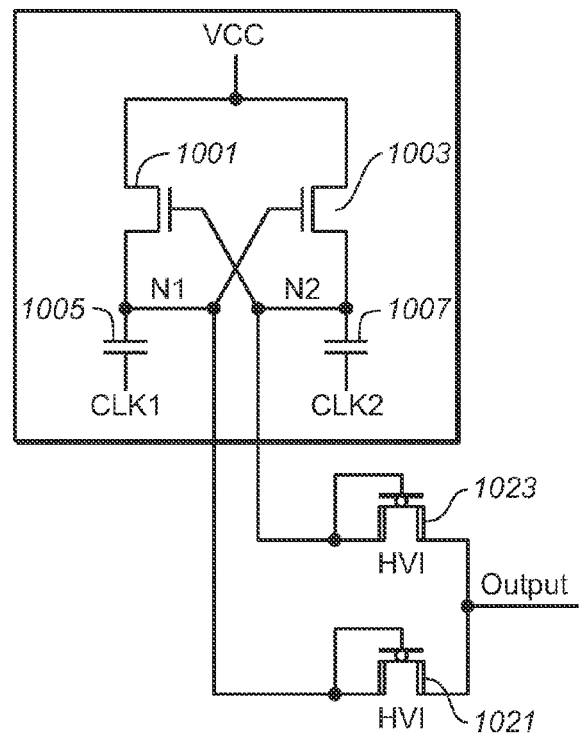
FIGS. 10A and 10B illustrate a typical voltage doubler circuit and its clock signals.
Figure 10B:
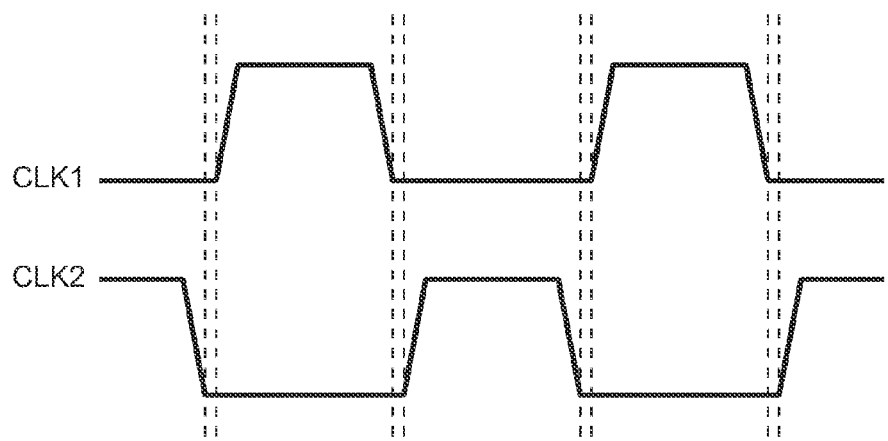

This can be illustrated with respect to FIGS. 10A and 10B, These shows a fairly typical voltage doubler arrangement, similar to FIGS. 4A and 4B, but without the Vt cancellation part. In FIG. 10A, one each of the two legs a transistor 1001, 1003 is connected between the supply level VCC and, through a respective capacitor 1005, 1007 to a clock signal CLK1, CLK2. The output of each leg is then taken from the intermediate node N1, N2, which is also cross-coupled to the gate of the transistor 1003, 1001 for the other leg. In FIG. 10A, the output of each leg is supplied to the output of the section through a respective diode connected transistor 1021, 1023. The clock signals CLK1, CLK2 can be as discussed with respect to the other embodiments, such a FIG. 4B, and an example it shown in FIG. 10B.

The sort of problems described at the beginning of this section can be particularly acute as lower and lower supply levels are used. For example, a design that can successfully meet design requirements at a VCC value of, say, 2.5V, may have its output collapse as VCC values go to 2.0V and below, such as, say, VCC=1.5V. This sort of "self-loading" effect can become a serious problem for both positive and negative charge pump designs where the voltage doubler may be used as a basic component of a DC-DC converter, as the output drains off the output nodes (N1, N2 in FIG. 10A) faster than VCC can resupply the nodes. The usual positive feedback arrangement ends up going backwards.

Figure 11A:
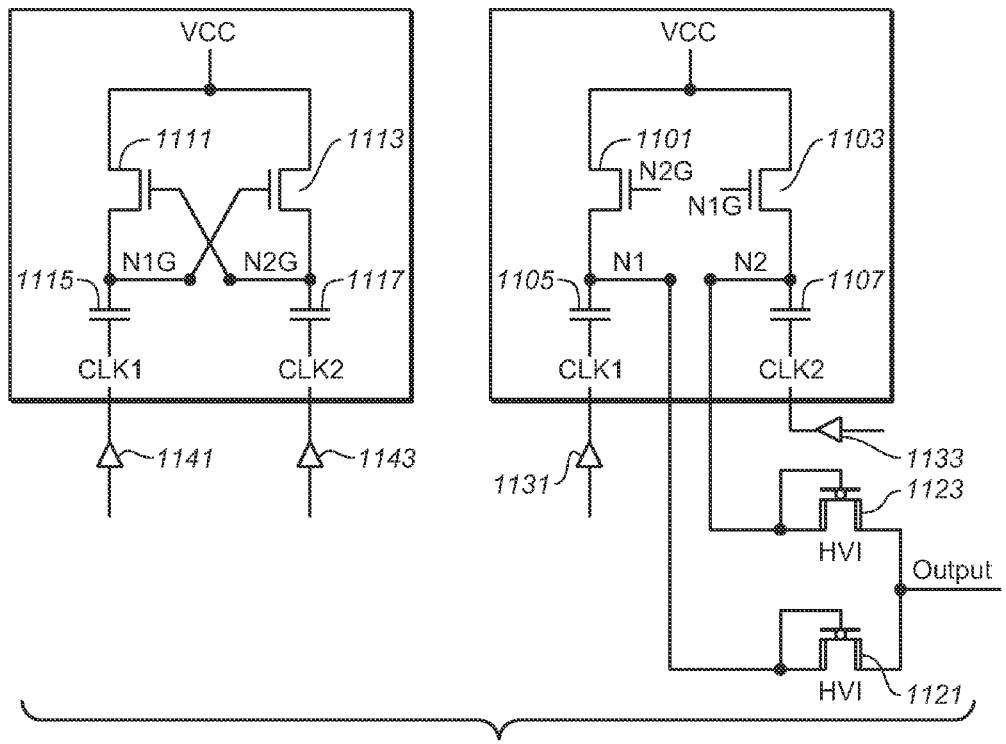
FIGS. 11A and 11B illustrate an exemplary embodiment of an efficient voltage doubler circuit and its clock signals.
Figure 11B:
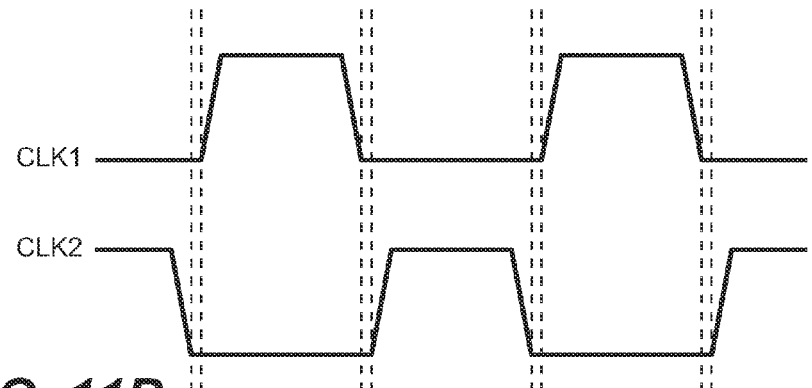

To get around this problem, the gates of the transistors in each leg are no longer cross-coupled to the intermediate node of the other leg. Instead, an auxiliary pump of a corresponding structure is used to provide the control gate voltages, where an exemplary embodiment is shown in FIGS. 11A and 11B. On the right side of FIG. 11A an output stage or section of the charge pump system is configured similarly, and numbered similarly, to the pump section of FIG. 10A, except that the transistors 1101, 1103 are no longer respectively cross-coupled to the node N2, N1 so that the gates are no longer directly coupled to the output.

On the left side of FIG. 11A is an auxiliary pump stage or section. This is again arranged as a doubler section with transistors 1111, 1113 respectively connected between VCC and N1G, N2G, and with capacitors 1115, 1117 respectively connected between N1G, N2G and CLK1, CLK2. The gate of 1111 is then coupled to N2G and the gate of 1113 is coupled to N1G. The gates of the output section are also connected to these nodes of the auxiliary section, with the gate of 1101 coupled of N2G and the gate of 1103 coupled to N1G.

Under the arrangement of FIG. 11A, the notes N1, N2 of the output section are providing the output and can be sized based on the load requirements. For the auxiliary section, the nodes N1G, N2G are not providing the output, but are only controlling the gates of 1101, 1103, 1111, 1113; consequently, the transistors 1111, 1113 and the capacitors 1115, 1117 can be sized much smaller than the corresponding elements of the output section. For instance, in a typical application, could only be 10% or 5% of the size. Consequently, although the auxiliary section would appear to require some additional layout area to drive transistor 1101 and 1103, the original sizing of main stage doubler must account the extra gate loadings if used without the auxiliary pump to drive the gates; however, if the consequences of dealing with the self-loading effect are taken into account, then sort of design illustrated with respect to FIG. 11A can be smaller in size since it has a higher efficiency than the design of FIG. 10A.

As before, the clock signals CLK1, CLK2 are non-overlapping signals, as shown in FIG. 11B. Although the output and auxiliary section use the same clock signals and can share the same drivers, in many applications it may be preferable to use separate drivers. This is illustrated schematically by the drivers 1131, 1133, 1131, 1143 in FIG. 11A. The use of separate drivers can help with a secondary "self-loading" effect due to current load. If the two sections share same drivers, this can result in a slew rate affecting the clock amplitude.

Figure 12A:
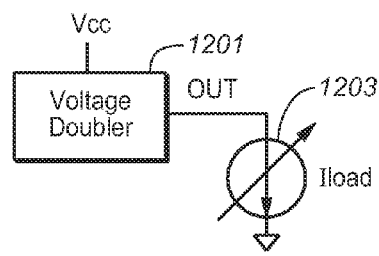
FIGS. 12A and 12B compare the behaviors of the circuits in FIGS. 10A and 11A under varying current load.
Figure 12B:
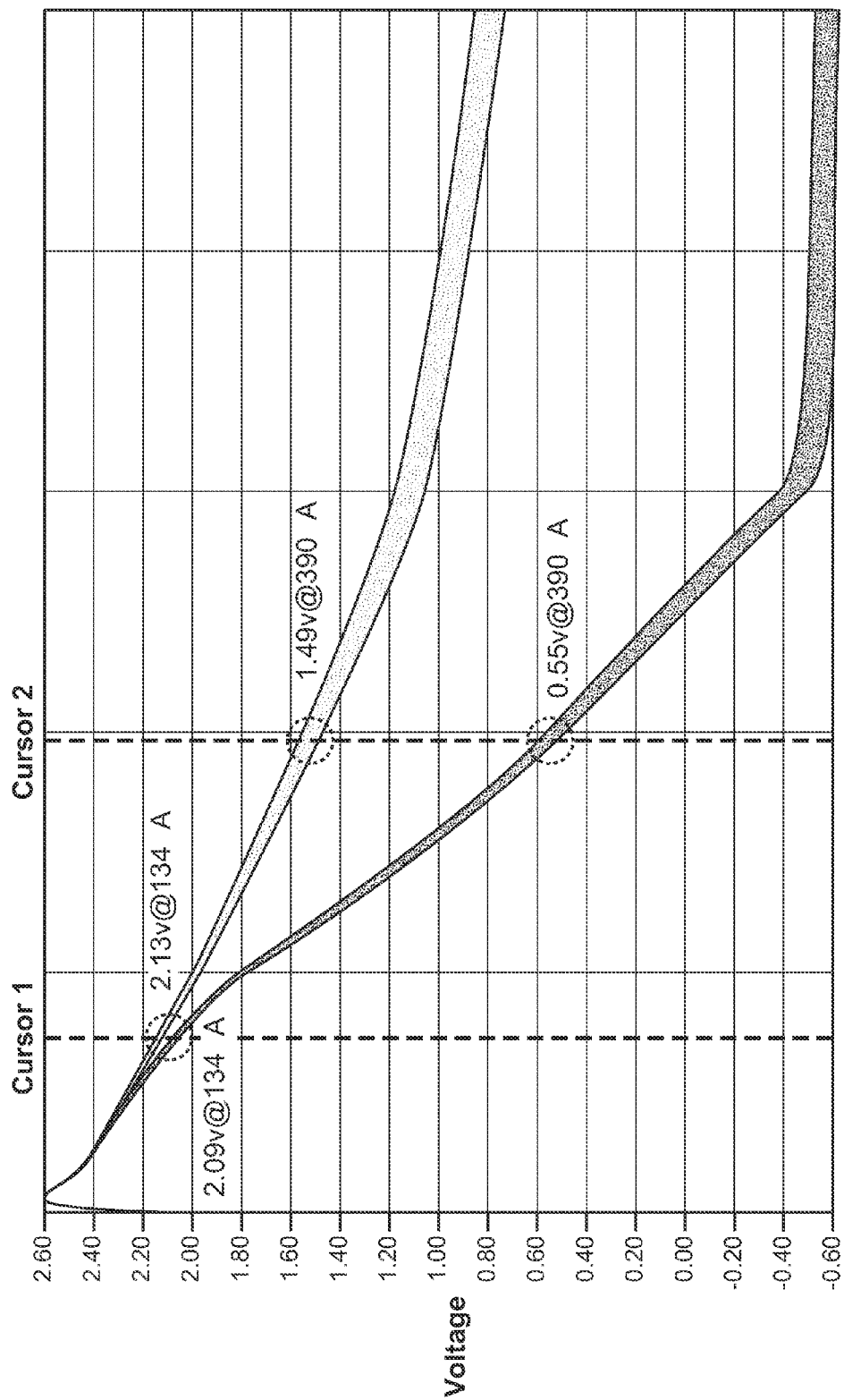

The relative improvement of an embodiment such as shown in FIG. 11A with respect to the basic doubler illustrated in FIG. 10A can be illustrated with respect to FIGS. 12A and 12B. FIG. 12A schematically illustrates a test arrangement. A voltage double 1201 has an input voltage 1201 driving a variable load Iload 1203 with OUT. In this example, Vcc is 1.5V and the same clocks and load are used for both the standard doubler and the arrangement of FIG. 11A. The test sweeps load from 0 mA to 1 mA over 100 µs. The changes in OUT for the two cases are compared in FIG. 12B.

The bottom trace in FIG. 12B is for the typical voltage doubler, the top trace is for using the auxiliary section as in FIG. 11A. Both traces are similar out to about a load of 134 µA (at "Cursor 1"), after which the traditional voltage doubler's output rapidly falls off, even going negative. Although OUT for the version with the auxiliary section also drops off, it is much less severe.

The aspects discussed in this section are complimentary to those of the previous section, so that the various aspects described above can, be need not, be combined with embodiments such as those described with respect to FIG. 11A. For example, the Vt cancellation arrangement described with respect to FIG. 4A can also be incorporated, where either a second auxiliary section can be used for the Vt or the same auxiliary stage can be used for both purposes.

The arrangement of FIG. 11A can also be incorporated in the multi-stage pumps, either with or without the threshold voltage cancellation or the self-adaptive multi-stage arrangements of FIG. 9. As the latter stages of the output sections will already have a boosted input, in one variation only the first stage, with the lowest input, would use the arrangement of FIG. 11A. If multiple auxiliary sections are used, both these and output sections can be connected in series similarly to what is shown in FIG. 9, but with the connections between an output section and its corresponding auxiliary section arranged as in FIG. 11A. In one set of embodiments, the multi-stage version can be arranged with both the output section and the auxiliary section at each stage level sharing a common input taken (after the first stage) from the preceding output section's output. In this version, each stage would resemble FIG. 11A, except the input of stages after the first uses the output of the previous stage. Alternately, both the main, output sections and the auxiliary sections can be separately cascade, with the auxiliary section at each level attached to the control gates of the corresponding main gate, in an arrangement more closely resembling FIG. 9, but with the intra-level connections as in FIG. 11A. In this second alternative, additional circuitry can be introduced to reduce feed through problems should the voltage deviation between the corresponding main and auxiliary section become too great.

For any of the described embodiments, the techniques of this section can significantly improve the I-V curve of the pump relative to the conventional arrangement, improving the pumps capability significant power or area overhead. As discussed above, this results in high efficiencies in terms of power and area for the same load line, particularly as the conventional voltage doubler may collapse under heavy loads. Additionally, the design and layout are simple.

CONCLUSION

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump circuit to generate an output voltage provided at an output node, including:

an output generation stage having:
a first branch, including a first transistor connected between a stage input voltage and, through a first nod; a first plate of a first capacitor, and
a second branch, including a second transistor connected between the stage input voltage and, through a second node, a first plate of a second capacitor, wherein a second plate of the first capacitor and a second plate of the second capacitor respectively receive first and second non-overlapping clock signals;
first and second output gates respectively connected between the first and second nodes and a stage output node; and
an auxiliary section stage having:
a first branch, including a third transistor connected between the stage input voltage and, through a third node, a first plate of a third capacitor, and
a second branch, including a fourth transistor connected between the stage input voltage and, through a fourth node, a first plate of a fourth capacitor, wherein a second plate of the third capacitor and a second plate of the fourth capacitor respectively receive the first and second non-overlapping clock signals, and wherein the gate of the third transistor is connected to the fourth node and the gate of the forth transistor is connected to the third node, and
wherein the gate of the first transistor is connected to the fourth node and the gate of the second transistor is connected to the third node,
wherein the output generation stage is one of a plurality of N output generation stages connected in series and the auxiliary section stage is the corresponding one of a plurality of N auxiliary section stages connected in series, and
wherein the input voltage of each of the auxiliary section stages subsequent to the first of the series is independent of the input voltage of the corresponding output generation stage.

2. The charge pump circuit of claim 1, wherein the first and second clock signals are provided to the output generation stage from a first clock driver circuitry and the first and second clock signals are provided to the auxiliary section stage from a second, different clock driver circuitry.

3. The charge pump circuit of claim 1, wherein the third and fourth transistors are sized smaller than the first and second transistors and the third and fourth capacitors are sized smaller than the first and second capacitors.

4. The charge pump circuit of claim 3, wherein the third and fourth transistors are sized to be less than a tenth the size of the first and second transistors and the third and fourth capacitors are sized to be less than a tenth the size of the first and second capacitors.

5. The charge pump circuit of claim 1, wherein the first and second output gates are implemented as diode connected transistors.

6. The charge pump circuit of claim 1, wherein the first and second output gates are implemented as fifth and sixth transistors respectively connected between the first and second nodes and the output node, where gates of the fifth and sixth transistors are respectively connected to received boosted versions of the first and second clock signals.

7. The charge pump circuit of claim 1, wherein the output generation stage is the first of a plurality of N output generation stages connected in series.

* * * * *